April 8, 1947.  A. T. HOLISTER ET AL  2,418,770
GRINDING MACHINE FOR COIL SPRINGS
Filed Nov. 15, 1943  4 Sheets-Sheet 1
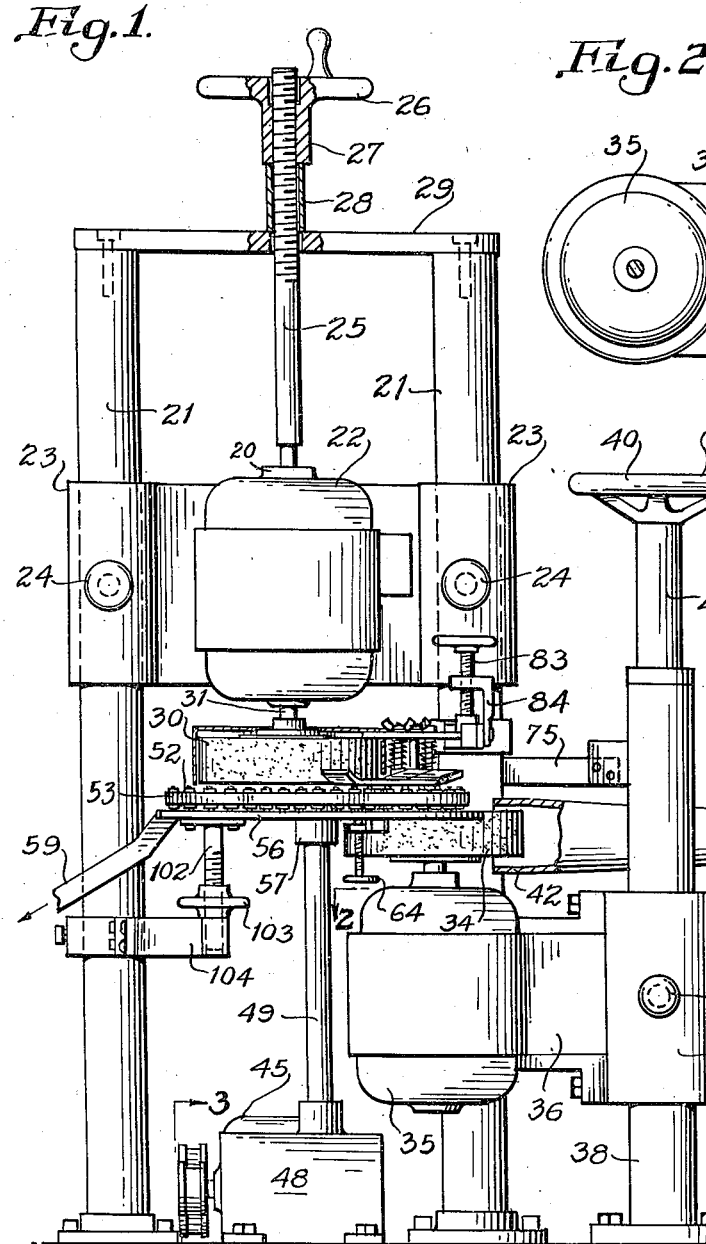
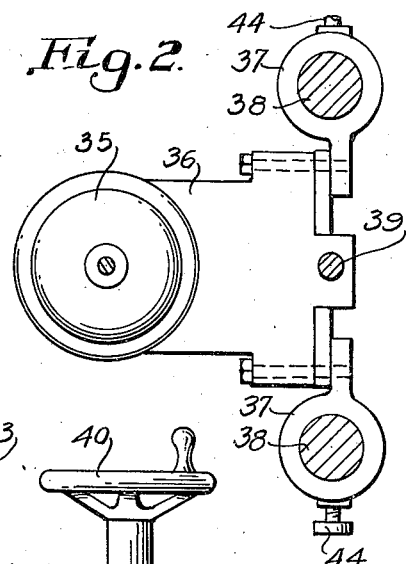
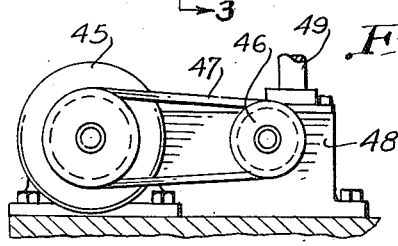
Arthur T. Holister
& Frank O. Holister
INVENTORS.
BY Carlos G. Stratton
ATTORNEY.

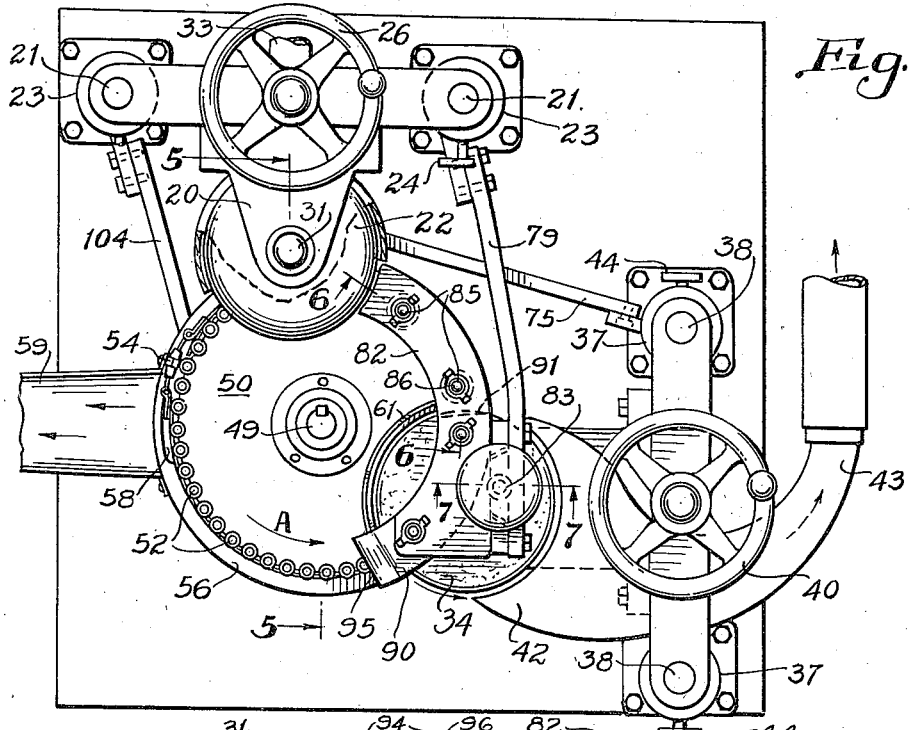
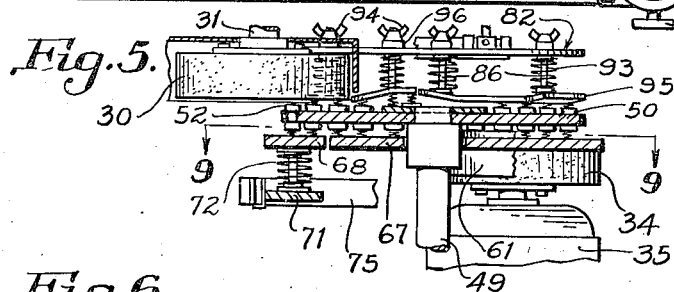
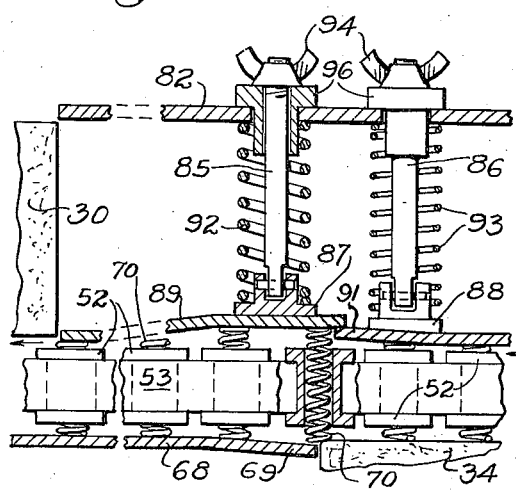
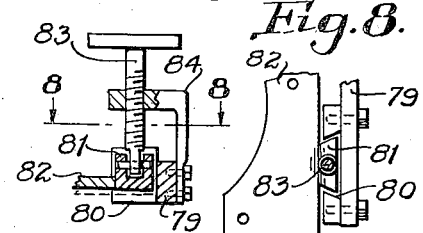

April 8, 1947. A. T. HOLISTER ET AL 2,418,770
GRINDING MACHINE FOR COIL SPRINGS
Filed Nov. 15, 1943 4 Sheets-Sheet 3
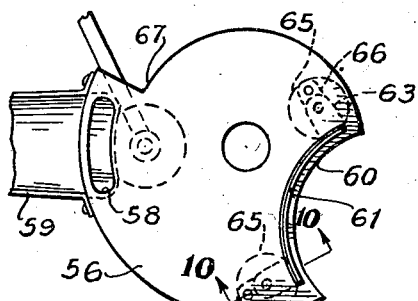
Fig. 9.
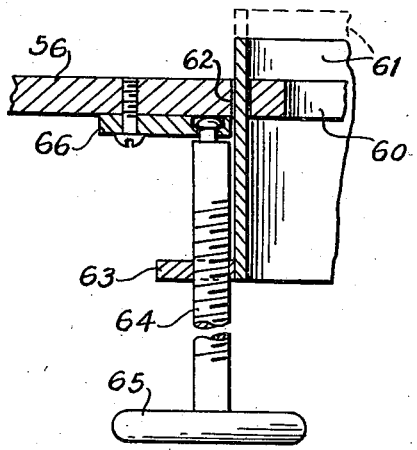
Fig. 10.
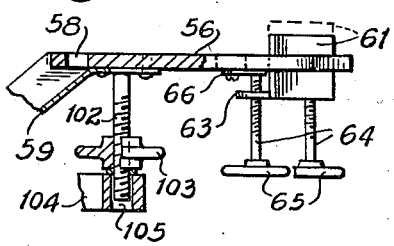
Fig. 11.
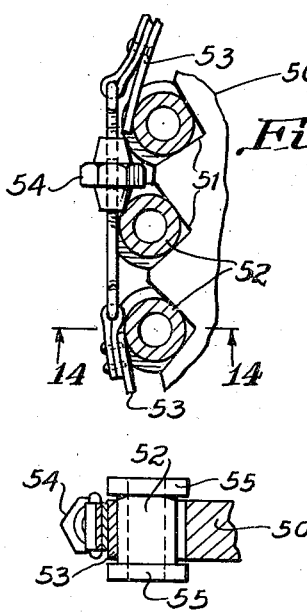
Fig. 13.
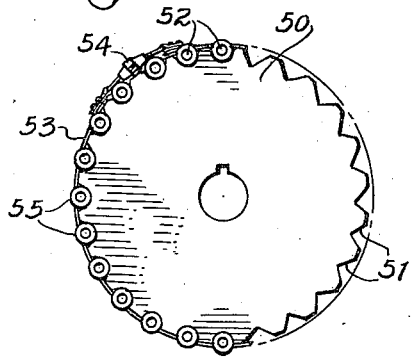
Fig. 12.
Fig. 14.
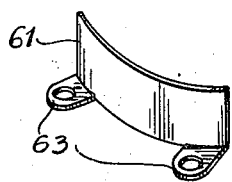
Fig. 15.
Arthur T. Holister
and Frank O. Holister
INVENTORS.
BY Carlos G. Stratton
ATTORNEY.

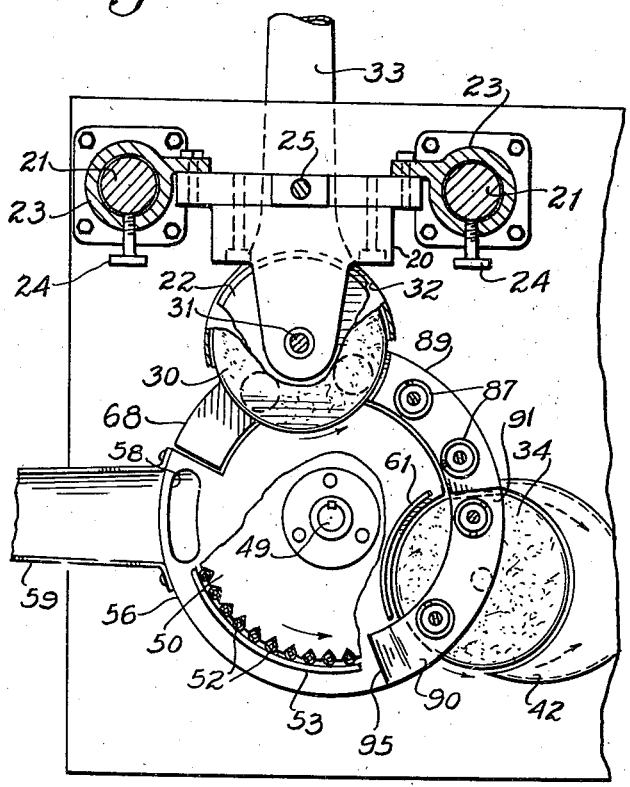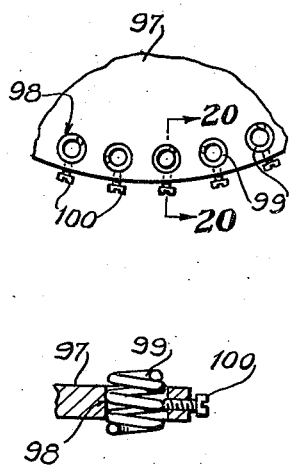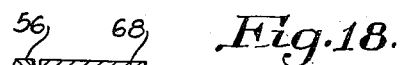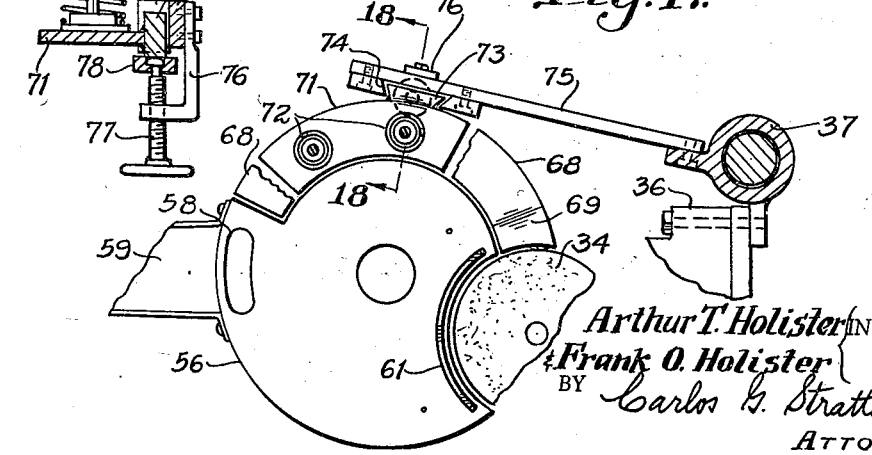

Patented Apr. 8, 1947

2,418,770

UNITED STATES PATENT OFFICE 2,418,770

GRINDING MACHINE FOR COIL SPRINGS

Arthur T. Holister and Frank O. Holister, Los Angeles, Calif.

Application November 15, 1943, Serial No. 510,272

11 Claims. (Cl. 51—118)

Our invention relates to a grinder, and more particularly to a machine for grinding the ends of coil springs.

An important object of the invention is to provide means for grinding both ends of coil springs, but not simultaneously.

Another object of the invention is to provide means to carry coil springs past one end-grinding element and past an opposite-end grinding element, in a single operation.

A further object of the invention is to provide means to resiliently maintain the springs in engagement with the grinding devices.

Our invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts of the several views.

Fig. 1 is an elevational view of a machine embodying the foregoing objects, partly broken away.

Fig. 2 is a section taken on the line 2—2 of Fig. 1.

Fig. 3 is an elevation looking in the direction of the arrows 3—3 of Fig. 1.

Fig. 4 is a plan view of the embodiment shown in Fig. 1.

Fig. 5 is a sectional view, taken on the line 5—5 of Fig. 4.

Fig. 6 is an enlarged, broken section, taken on the curved line 6—6 of Fig. 4.

Fig. 7 is a broken section taken on the line 7—7 of Fig. 4.

Fig. 8 is a horizontal section taken on the line 8—8 of Fig. 7.

Fig. 9 is a horizontal section taken on the line 9—9 of Fig. 5.

Fig. 10 is an enlarged, transverse section taken on the line 10—10 of Fig. 9.

Fig. 11 is a side elevation, partly in section, looking in the direction of the arrow A of Fig. 9.

Fig. 12 is a plan view of a carrier comprised in the invention.

Fig. 13 is an enlarged detail view of a portion of the circumference of the carrier.

Fig. 14 is a transverse section taken on the line 14—14 of Fig. 13.

Fig. 15 is a perspective view of a guard element comprised in the machine.

Fig. 16 is a horizontal sectional view of the present embodiment, broken away at different elevations.

Fig. 17 is another horizontal section, but taken at a lower elevation than Fig. 16.

Fig. 18 is an enlarged, transverse section, taken on the line 18—18 of Fig. 17.

Fig. 19 is a fragmentary view of the circumference of a modified carrier.

Fig. 20 is an enlarged, transverse section, taken on the line 20—20 of Fig. 19.

Referring more in detail to the drawings, the reference numbers 21 indicate twin standards upon which an offset motor 22 is mounted to slide by means of guide sleeves 23 upon a bracket plate 20. Set screws 24 may be employed to fasten the motor 22 in a desired vertical position. Upon release of the set screws, the motor 22 may be adjusted vertically by means of a threaded post 25 mounted on the motor 22. A hand wheel 26 adjusts a nut 27, which in turn raises or lowers the threaded post 25 and thereby adjusts the vertical position of the motor. After adjustment, the set screws are again used to fasten the motor in position. The nut abuts against a spacing bushing 28 on a cross bar 29 upon the standards 21.

A top grinding wheel 30 of suitable abrasive material is mounted on the lower end of the motor shaft 31. A dust-catching hood 32 may be placed about the grinding wheel. Suitable suction means (not shown) are connected with the pipe 33 on the hood 32.

A bottom grinding wheel 34 is driven by means of a motor 35, which is mounted upon a bracket plate 36. Bushings 37 on the plate 36 are slidable upon twin standards 38. A threaded post 39 is operated by a hand wheel 40 in the same manner as the threaded post 25, the only difference being that the nut in the hand wheel 40 is shallower and the spacing bushing 41 is longer. Set screws 44 are shown for the bushings 37.

A dust-catching hood 42 is arranged around the bottom grinder 34. An exhaust pipe 43 is connected with suitable suction means (not shown).

Separate motor means 45 is employed to drive a sheave 46 by a belt drive 47. Reduction gearing 48 is connected to drive a vertical shaft 49, powered by the motor 45.

A carrier plate 50 is mounted upon the upper end of the shaft 49, to rotate therewith. The carrier plate 50 has a notched circumference 51, as clearly indicated in Fig. 12. A plurality of spool-shaped members 52 are placed in the notches around the carrier plate edge. A band 53 around the plate 50 and around the spools 52 maintains the spools in their engaged positions. Suitable turnbuckle means 54 tightens the band 53 in such position. The spools 52 have flanges 55 at the ends as perhaps best shown in Fig. 14, to prevent escape of the spools upward or downward out of the notches 51.

A stationary plate 56 is arranged below the carrier plate or table 50. The stationary plate 56 is adjustably supported by means of a bolt 102, which carries a nut 103 that rests upon a supporting arm 104. The arm has a bore 105 in which the bolt 102 may be adjusted vertically by turning movements of the nut 103. A bearing 57 on the under side of the plate 56 journals the shaft 49. The plate 56 has an outlet slot 58 that connects with a chute 59 for finished coil springs. The plate 56 also has a concave recess 60 cut in its circumference, conforming with the contour of the bottom grinding wheel 35. A curved guard 61 slides vertically in an arcuate slot 62 in the plate 56. The guard 61 has tapped lugs 63 for engaging vertical adjusting bolts 64. Wheels 65 control the bolts 64 respectively. A small plate 66 is bolted to the under side of the stationary plate 56 and has an enlarging recess in which grooved heads 67 of the bolts rotate. The bolts 64 rotatably depend from the recessed plates 66, to adjust the guide 61 upward or downward.

The stationary plate 56 also has a convex, arcuate recess 67, in which is disposed a curved plate 68. The leading edge 69 of the plate 68 is bent downward so as to relieve the tension of the springs 70 coming off the bottom grinder 34, as perhaps best shown in Fig. 6. A shelf 71 supports a series of coil springs 72, which in turn resiliently support the arcuate plate 68.

The shelf 71 has a dove-tail guide 73 that is engaged by a dove-tail recess 74 on a fixed bar 75, which is mounted on one of the bushings 37. The bar 75 has a depending bracket 76 in which is screwed an adjusting bolt 77. A plate 78 under the dove-tail 73 supports the bolt 77 in the same manner as the bolt 64 is supported in Fig. 10.

A similar, though inverted arrangement is provided for the other grinder 34. A fixed bar 79 is mounted on the right hand sleeve 23 in Fig. 4. The outer end of the bar 79 has a dove-tail recess 80 in which slides a dove-tail 81 upon an abutment plate 82. An adjusting bolt 83 in an angle bracket 84 is connected with the dove-tail 81 for vertical adjustment of the abutment plate 82.

Pins 85 and 86 are threaded at their upper ends and connected at their lower ends to feet 87 and 88 which are mounted upon plates 89 and 90 which overlap at their adjacent ends, as shown in Fig. 6. The plate 90 is bent upwardly at its ends. The end 91 terminates to the right of the circumference of the grinder 34 as shown in Fig. 6. To explain this further, it will be noted in Fig. 6 that the axis of the spring 70 that is entirely exposed is approximately at the circumference of the grinder 34. However, it will also be noted that the end 91 of plate 90 terminates at the right of said spring, and that the plate 87 is farther away from the grinder 34 than the plate end 91. This permits expansion of the spring 70 before it leaves the grinder 34 (the direction of travel of the spring 70 in Fig. 6 being from right to left—see arrows). Then the downward tipping of the plate end 69 permits even further expansion of the spring 70.

A helical spring 92 is coiled around the pin 85 and abuts the foot 87 and the plate 82. A helical spring 93 abuts the foot 88 and the plate 82. The spring 92 is preferably heavier than the spring 93, inasmuch as the spring 92 compresses the springs 70 to go under the grinder 30, whereas the springs 93 merely resiliently urge the springs 70 against the first grinder 34. Nuts 94 are screwed on the upper threaded ends of the pins 85, 86, to adjust the tension of the springs 92, 93. Collars 96 are provided for the nuts. The plate 90 is upwardly inclined at its forward end 95.

Figs. 19 and 20 show a modified construction. The plate 97 has a series of openings 98 spaced inwardly a short distance from its perimeter. This arrangement is of particular advantage in dealing with short springs 99. Set screws 100 maintain the springs 99 in position in the openings 98.

In the operation of our present machine, the motors 22, 35 and 45 are turned on. This causes the grinder 30 and 34 and the table 50 to rotate, respectively. Of course, the grinders rotate rapidly, while the turntable 50, under the influence of the reduction gearing 48, rotates comparatively slowly in the direction of the curved arrow A in Fig. 4.

The spools 52 are held in the notches in the perimeter of the plate 50 by the band 53. The operator drops springs 70 in the spools 52, while the spools are between the outlet 58 and the end 95 of the plate 90. The plate 90, under the influence of the springs 93, resiliently urges the springs 70 against the grinder 34, whereby the lower ends of the springs are squared off.

The tension on the springs 70 is gradually taken off as the springs near the edge of the rotating grinder, by means of the upwardly tipped rear end 91 of the plate 90. Then the tension on the springs 70 is substantially removed when the spring steps off the plate end 91 on to the plate 89, as shown in Fig. 6. There is then a slight drop for the spring 70 on to the downwardly tipped end 69 of the lower plate 68.

As the plate 89 extends down toward the spools 52 (see broken lines in Fig. 6), the springs 70 are again compressed, this time sufficiently to pass under the upper grinder 30 all in the direction of the arrows in Fig. 6. Thereupon the plate 68 yieldingly urges the springs 70 upward against the bottom face of the grinder 30. The plate, in such movement, acts under the influence of the coil springs 72 thereunder. The tops of the springs are thereby squared off, and the springs are sized to the desired length.

Further rotation of the turntable 50 carries the springs 70 over the outlet 58. The finished springs 70 thereby drop from the spools 52, through such outlet and down the chute 59, into a suitable container.

The guard 61 is adjusted to confine flying particles from the grinder 34, which are drawn off through the suction hood 42. The suction in the hood 32 draws off particles produced by the grinder 30.

It will be noticed that practically all parts of the machine are adjustable in order to take up for wear on the grinders and springs employed in the machine, as well as to grind off springs into different lengths. The wheels 26 and 40 provide adjustments for the grinding wheels. The bolts 77 and 83 provide adjustments for the top and bottom plates against which the springs 72 and 93 abut for urging the springs 70 against the grinders. The nuts 94 provide further adjustment for the upper coil springs 92 and 93.

While we have illustrated and described what we now regard as the preferred embodiment of our invention, the construction is, of course, subject to modifications without departing from the spirit and scope of our invention. We, therefore, do not wish to restrict ourselves to the particular form of construction illustrated and described, but desire to avail ourselves of all modifications that may fall within the scope of the appended claims.

Having thus described our invention, what we claim and desire to secure by Letters Patent is:

1. In a grinding machine for coil springs, a rotary grinding element having a flat grinding surface, an abutment plate spaced opposite the grinding surface at a dimension to maintain springs under tension against such surface, the abutment plate being bent away from said grinding surface near the end of such surface, considering the direction of travel of springs across said surface, to relieve tension of the springs before they leave the grinder, and carrier means mounted to slide coil springs across the grinding surface and the abutment plate, and the carrier permitting freedom of compression and extension of the spring under the influence of the bent abutment plate.

2. In a grinding machine for coil springs, a rotary grinding element having a flat grinding surface, a spring-urged abutment plate spaced opposite the grinding surface at a dimension to yieldingly maintain springs under tension against such surface, the abutment plate being bent away from said grinding surface near the end of such surface, considering the direction of travel of springs across said surface, to relieve tension of the springs before they leave the grinder, and carrier means mounted to slide coil springs across the grinding surface and the abutment plate, and the carrier permitting freedom of compression and extension of the spring under the influence of the bent abutment plate.

3. In a grinding machine for coil springs, a pair of offset, rotary grinders, abutment plates spaced opposite the grinders to maintain springs under tension against the grinders respectively, the abutment plates being arranged to move the springs against the grinders in opposite directions to grind opposite ends of the springs, and carrier means mounted to slide coil springs between the abutment plates and the grinders, the first abutment plate, in the direction of travel of the carrier, being bent away from its respective grinding surface near the end of such surface, to relieve tension of the springs before they leave the first grinder, means to compress the springs again after they leave the first grinder, the latter means disposed to feed compressed springs between the second grinder and its opposed abutment plate.

4. In a grinding machine for coil springs, a pair of offset, rotary grinders, spring-urged abutment plates spaced opposite the grinders to yieldingly maintain springs under tension against the grinders respectively, the abutment plates being arranged to yieldingly move the springs against the grinders in opposite directions to grind opposite ends of the springs, and carrier means mounted to slide coil springs between the abutment plates and the grinders, the first abutment plate, in the direction of travel of the carrier, being bent away from its respective grinding surface near the end of such surface, to relieve tension of the springs before they leave the first grinder, spring-urged means to yieldingly and progressively compress the springs again after they leave the first grinder, the latter means disposed to feed compressed springs between the second grinder and its opposed abutment plate.

5. In a grinding machine for coil springs, a pair of offset, rotary grinders, non-rotary, resilient means having inclined ends adjoining each other arranged opposite the grinding elements to yieldingly compress coil springs in one direction against one grinder in a direction parallel with the axis of such grinder and to relieve the compression of said springs prior to passing from said grinder, said means arranged to then yieldingly compress the springs in the opposite direction against the other grinder in a direction parallel with the axis of the latter grinder, and carrier means mounted to rotate in the spaces between the grinders and the resilient means and having provision to carry coil springs from the one grinder to the other.

6. In a grinding machine for coil springs, a rotary grinding element having a grinding surface, an abutment plate spaced opposite the grinding surface at a dimension to maintain springs under tension against such surface, the abutment plate being bent away from said grinding surface near the end of such surface, considering the direction of travel of springs across said surface, to relieve tension of the springs at least partially before they leave the grinding surface, and carrier means mounted to slide coil springs between the grinding surface and the abutment plate.

7. In a grinding machine for coil springs, rotary grinding elements arranged to grind opposite ends of the springs, one at a time, a carrier arranged to move coil springs from one grinding element to the other, and spring-urged plates having portions disposed to yieldingly relieve the tension of springs ground by the first element and thereafter to resiliently increase the tension of the springs and arranged to yieldingly feed the compressed springs to the second grinding element.

8. In a grinding machine for coil springs, a pair of offset rotary grinders, spring urged abutment plate means opposite said grinders yielding to maintain springs under compression against the respective grinders, said plate means having portions arranged to relieve the tension of said spring before they leave the first grinder and to re-compress said springs after they leave the first grinder, and carrier means to slide coil springs between said abutment plate means and grinders and to feed re-compressed springs between the second grinder and its opposed abutment plate.

9. In a grinding machine for coil springs, the combination of: rotary grinding elements arranged to grind opposite ends of the springs, one end at a time, a carrier to move coil springs from one grinding element to the other, plates successively to maintain the springs in compression and having portions arranged to relieve the compression on said springs before passing from one grinder and thereupon to cause the re-compression of said springs and maintain same in compression during the movement of said springs relative to the other grinder.

10. In a grinding machine for coil springs, a pair of rotary grinders offset vertically and horizontally, lower horizontal abutment plate means below one of the grinders to maintain springs under compression against and during the passage thereof across said grinder, upper horizontal abutment plate means above the other grinder to maintain springs against the latter grinder, said plates being arranged to engage successively the opposite ends of the springs, the upper and lower plate means being arranged to relieve the tension of the springs as they are slid from the first grinder and providing therebetween a tapered passageway for compressing the springs as they are slid to the second grinder, and a horizontal rotary carrier between the grinders and the plates for sliding coil springs along the respective abutment plates to grind first one and then the other end of said springs.

11. In a grinding machine for coil springs, a pair of rotary grinders offset vertically and horizontally, lower horizontal abutment plate means below one of the grinders to maintain springs under compression against and during the passage thereof across said grinder, upper horizontal abutment plate means above the other grinder to maintain springs against the latter grinder, said plates being arranged to engage successively the opposite ends of the springs, the upper and lower plate means being arranged to relieve the tension of the springs as they are slid from the first grinder and arranged to thereafter compress the springs as they are slid to the second grinder, and a horizontal rotary carrier between the grinders and the plates for sliding coil springs along the respective abutment plates to grind first one and then the other end of said springs, said carrier having means for dropping the ground springs therefrom.

ARTHUR T. HOLISTER.
FRANK O. HOLISTER.

REFERENCES CITED

The following references are of record in the file of this patent:

UNITED STATES PATENTS

| Number | Name | Date |
| --- | --- | --- |
| 641,545 | Richmond et al. | Jan. 16, 1900 |
| 1,142,700 | Halstead | June 8, 1915 |
| 1,763,820 | Rodemeyer | June 17, 1930 |
| 1,371,854 | Buck | Mar. 15, 1921 |
| 751,791 | Haskins | Feb. 9, 1904 |
| 1,164,336 | Erickson et al. | Dec. 14, 1915 |
| 1,978,674 | Johnson | Oct. 30, 1934 |
| 1,436,309 | Frost | Nov. 21, 1922 |